United States Patent [19]
Porath

[11] Patent Number: 6,013,525
[45] Date of Patent: Jan. 11, 2000

[54] IRON ENRICHED DUCKWEED EXTRACT

[76] Inventor: Dan Porath, 88 Haim Levanon Street, Ramat Aviv 69345, Israel

[21] Appl. No.: 08/871,350

[22] Filed: Jun. 9, 1997

[30] Foreign Application Priority Data

Nov. 11, 1996 [IL] Israel .......................................... 119602

[51] Int. Cl.⁷ ..................................................... A01N 65/00
[52] U.S. Cl. .......................... 435/430; 47/58.1; 424/195.1
[58] Field of Search .............................. 435/430; 47/58.1; 424/195.1

[56] References Cited

U.S. PATENT DOCUMENTS 3,935,673  2/1976  Robbins .
5,350,735  9/1994  Kinnersley et al. .
5,393,426  2/1995  Raskin et al. .

*Primary Examiner*—Leon B. Lankford, Jr.
*Attorney, Agent, or Firm*—Webb Ziesenheim Logsdon Orkin & Hanson, P.C.

[57] ABSTRACT

A process for the enrichment of selected mineral content of a higher plant comprising, cultivating a plant in soil-free growth medium; introducing selected minerals into a liquid component of growth medium for uptake into a plant, grinding a plant to a form a mashed product; and, separating liquid from a mashed product to form at least one concentrated extract product.

9 Claims, No Drawings

IRON ENRICHED DUCKWEED EXTRACT

The present invention relates to a process for the enrichment of higher plants, resulting in an increased content of targeted minerals therein.

Duckweeds are fast growing aquatic plants. They have been used for removal of excess mineral and organic nutrients from water as part of novel sewage disposal systems. In nature they grow at lake and pond edges because of their free floating nature, and the effects of wind. For sewage control special floating matrices and devices have been designed and patented by Lemna Corporation of Minnesota, U.S.A. to fully cover ponds. In nature, the duckweeds grow in coexistence with unicellular and filamentous algae; this mixture is sometimes seen dribbling from the mouths of moose and is known as "moose muck". Clearly, such a mixture from nature is not suitable for human consumption, nor would duckweed from primary or most secondary sewage purification facilities be suitable for human consumption due to the presence of intestinal-microbe and virus contamination and/or heavy metal accumulation. In some circumstances, duckweeds thus grown could be used as animal fodder.

In Eastern Asia, duckweeds of Wollfia sp. are grown for human consumption in earthen ponds, but such material would not meet western specifications for human consumption as human wastes enter such ponds, either as fertilizer or as seepage, and nothing is done to control these contaminants.

The term "human consumption" refers to consumption of a product having an acceptable taste and texture, having nutritive value and being free of dangerous levels of contaminants.

Landolt, E. and Kandeler, R. (1987), The Family of Lemnaceae, a Monographic Study, Vol. 2, pp. 382–389, Veroffentlichungen des Geobotanischen Institutes der ETH Stiftung Rubel Zurich, 95 Heft, explains the restricted use of duckweeds as follows:

(1) Duckweeds especially of the genera Spirodela and Lemna often contain offensive amounts of oxalic acid. This is lacking in the smaller genera Wollfia and Wolfiella.

(2) The harvested Lemna are difficult to separate from snails, insects, worms, protozoa, algae and bacteria. Pond waters were reported to contain (per liter) $10^8$ coliform ($10^6$ fecal), $10^4$ fecal streptococci, 300 salmonella and shigella pathogens and pathogenic viruses. He states: "Further investigations on safe cultivation of Lemnaceae are needed".

In Israel Patent 75435 there is described and claimed a method for determining the suitability of a duckweed clone for aquaculture comprising:

a) providing a plurality of containers with minerals and organic waste material intended for use as duckweed nutrient;

b) separately placing a predetermined density of biomass of a specific duckweed clone in an aqueous medium in each container;

c) adjusting and maintaining the ammonia concentration in said container in a range of about 25 to about 200 mg ammonia per liter;

d) measuring dry mass output, protein output and relative growth rate of various duckweed clones in said containers as a function of time; and e) selecting and cultivating duckweed clones which at an initial density of between about 400 g/m$^2$ and 600 g/m$^2$ yield a dry mass output of at least 7.5 g/m$^2$/day, and a protein output of at least 2.5 g/m$^2$/day, and exhibit a relative growth rate of at least 0.15 g/g/day in said aqueous medium.

The teachings of said patent, as relevant, are incorporated herein by reference.

The term "duckweed" as used herein refers to any plant that is a member of the botanical family of Lemnaceae, a family of small free floating aquatic plants.

Said patent showed how to select duckweed strains for rapid growth and nutrient utilization, with cultivation of duckweeds for fish and farm animal fodder and while a possible use also for human consumption was mentioned, the clones used and described therein, as well as the growth conditions utilized, have been found not to be suitable for harvesting for human consumption.

The pioneer work of Edna Ben-Izhak Monselise, et al. on $NH^+_4$—N assimilation with the use of Nuclear Magnetic Resonance (NMR) system (New Phytol. (1987) 107, 341–345) questions the significance of the plurality of containers system suggested in Israel Patent 75435 for nutrient utilization by the different strains and, instead, suggests $NH^+_4$ uptake as the unique criteria for optimizing an aquaculture complex.

U.S. Pat. No. 5,269,819 (corresponding to IL 95873), discloses that it was realized that clean-grown *Lemna gibba* strain Hurfeish isolated from nature and brought into axenic (contamination free) culture in the laboratory, was edible and neutral in taste.

The above-mentioned patent states that from a culinary/palatability point of view this strain would be unacceptable.

Said patent discloses an aquaculture complex for high protein crop production of a duckweed clone suitable for human consumption comprising a body of water in combination with duckweed clones, the majority of said clones being characterized by having less than three roots per clone, said roots being less than 15 mm in length, and having at least two attached fronds, at least one of said fronds being characterized by a frond thickness greater than 1 mm and a frond length greater than 4 mm. Such duckweeds, produced with human safety considerations in mind, have a high market potential as a luxury food in the class with cress and mustard sprouts, and are superior to various sprouted seeds.

The teachings of said patent, as relevant, are also incorporated herein by reference.

Said patent teaches a method of selecting and culturing duckweed clones suitable for human consumption. However, does not teach or suggest any enrichment process relating thereto.

The ultimate goal of earlier studies, which were published in the above mentioned patents (No. 75435 and No. 95873), and in a recent publication "The Duckweed *Lemna gibba* cv. Galilee: A bio-technological Agent for Recycling Ammonium Ions into Available Proteins", Environmental Research Forum Vols. 5-6, pp. 307–312 (1996) by the present inventor, was to use higher plants as agents for $NH^+_4$ recycling to available proteins. In said article it was also reported that enrichment of the growing solution of Duckweed aquaculture with a chelated iron source doubled the iron content, since the iron binds to a high molecular weight protein constituent of the Duckweed which enables the isolation of an iron rich proteinous fraction. This discovery forms a basis for a first aspect of the present invention. The fact that a chelating iron complex enhanced iron accumulation in a specific protein, as described in the above mentioned publication, does not teach that any other mineral, namely potassium, will accumulate in the same mechanism, which discovery forms the basis for a second aspect of the present invention.

SUMMARY OF THE INVENTION

Thus, according to the present invention there is provided a process for the enrichment of selected mineral content of a higher plant comprising: a) cultivating said plant in a soil-free growth medium; b) introducing selected minerals into a liquid component of said growth medium for uptake into said plant; c) grinding said plant to form a mashed product; and d) separating liquid from said mashed product to form at least one concentrated extract product, wherein said selected minerals are selected from the group consisting of potassium, iron and mixtures thereof.

In a preferred embodiment of the present invention there is provided a process, wherein potassium constitutes more than 50% of the ash of said product, wherein said higher plant is a duckweed plant, wherein said concentrated extract products are formed from pulp remaining after the removal of sap therefrom and from the separated sap.

In a further embodiment of the present invention there is provided a concentrated higher plant extract product, having a potassium content at least seven and preferably ten times greater than the sodium content thereof.

In another preferred embodiment of the present invention there is provided a process for the enrichment of the iron content of a duckweed plant comprising: a) cultivating said plant in a soil-free growth medium; b) introducing a source of iron into a liquid component of said growth medium for uptake into said plant; c) grinding said plant to form a mashed product; and d) separating liquid from said mashed product to form at least one concentrated extract product having a wt/wt iron content greater than that of the intact plant, said product having an iron content of at least 1,200 mg/kg and preferably 2,000 mg/kg, wherein said iron content is at least two times greater than the manganese content thereof, wherein a chelated iron solution is introduced into a liquid component of said growth medium.

In another embodiment of the present invention there is provided a concentrated duckweed plant extract product having a wt/wt iron content greater than that of the intact plant, said product having an iron content of at least 1,200 mg/kg and preferably 2,000 mg/kg.

In a further embodiment of the present invention there is provided a concentrated duckweed plant extract product having an iron content at least two times greater than the manganese content thereof In another aspect of the invention there is provided a concentrated higher plant extract product having a lead content less than 3 mg/kg dry matter.

In a further aspect there is provided a concentrated higher plant extract product having a mercury content less than 0.3 mg/kg dry matter.

The higher plants used in the present invention are defined as vegetable crops which usually appear in the modern cooking books as appetizers containing essential nutritive constituents like minerals and vitamins. Such vegetable crops usually contain more than 90% water (see Table I).

TABLE I

UPDATED NUTRITIVE VALUE* OF GREENIS (FRESH WATER SPROUTS FROM THE LEMNACEAE) COMPARED TO A FEW COMMON VEGETABLES:

| A | WATER | PROTEIN | FAT | CARBOHYDRATES AVAILABLE | FIBRES | CALORIES |
|---|---|---|---|---|---|---|
| GREENIS | 94 | 2.0 | 0.25 | 1.2 | 0.55 | 28 |
| MUSHROOMS | 91 | 2.2 | 0.03 | 2.0 | 2.5 | 20 |
| SPINACH | 92 | 2.8 | 0,2 | 3.0 | 0.6 | 25 |
| LETTUCE | 95 | 1.2 | 0.2 | 2.0 | 1.4 | 15 |

| B | SODIUM | POTASSIUM | MAGNESIUM | CALCIUM | IRON AVAILABLE | TOTAL | CAROTENE | ASCORBIC ACID |
|---|---|---|---|---|---|---|---|---|
| GREENIS | 30 | 300 | 15 | 25 | 2.5–3.6 | 8–20 | 10 | 7–20 |
| MUSHROOMS | 15 | 450 | 10 | 30 | ? | 1.3 | — | 3.0 |
| SPINACH | 60 | 300 | 50 | 75 | ? | 3.5 | 3.75 | 10–35 |
| LETTUCE | 10 | 200 | 10 | 82 | ? | 3.1 | 0.3–0.6 | 5–20 |

*The nutritive values given above (gram/100 g fresh weight) are according to the R & D data prepared during the year 1991.

The dishes prepared from the mentioned intact higher plants cannot supply the suggested recommended daily dietary allowance of most or all known essential minerals and vitamins needed. The present invention relates therefore to finding biotechnological enrichment and processing procedures to improve industrial "raw material" originating from higher plants, namely those found in vegetable crops. The controlled growth of vegetable crops in liquid nutrient solution enable increasing the mineral and essential element content by enrichment methods, specifically, the uptake of potassium, iron and other essential elements.

Furthermore, the present studies have found that in such controlled growth solutions, the uptake of essential microelements is simultaneously enhanced while dramatic decrease of toxic elements occurs, namely a decrease in lead and mercury uptake as exemplified hereinafter (see Table II).

TABLE II

| Element | Domesticated | Open Lagoon |
|---|---|---|
| K | 79,157 | 38,678 |
| P | 22,889 | 8,891 |
| Na | 10,570 | 21,368 |
| Ca | 9,200 | 67,133 |
| S | 4,112 | 5,342 |
| Mg | 3,777 | 9,314 |
| B | 315.2 | 834.1 |
| Fe | 383.8 | 412 |
| Sr | 148.4 | 459 |
| Mn | 137.1 | 1,520 |
| Zn | 116.4 | 54.23 |
| Si | 89.3 | 372.2 |
| Cu | 9.4 | 13.8 |
| Al | 9.1 | 258.2 |
| Ba | 5.1 | 91.4 |

TABLE II-continued

| Element | Domesticated | Open Lagoon |
|---|---|---|
| Mo | <4 | <2 |
| Cr | 0.90 | 1.27 |
| Cd | <0.8 | 5.9 |
| Li | 0.95 | 3.62 |
| Se | <0.1 | <0.35 |
| Ni | <0.6 | 15.8 |
| V | <0.1 | 3.1 |
| Co | <1.1 | 3.3 |
| Pb | 0.69 | 15.4 |
| As | <0.8 | <0.04 |
| Ag | 0.11 | 0.35 |
| Sn | 0.35 | 0.52 |
| Ti | 0.12 | 4.53 |
| Hg | <0.03 | 0.94 |
| Total | 130,929.45 | 154,888.05 |
| Calculated - Ash | 13.1% | 15.5% |

Element expressed as mg/Kg on a dry weight basis

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1 a. Plant Cultivation and Potassium Mineral Enrichment:
1. PVC Cultivating ponds (13×1 m) were filled with tap water to 10–20 cm. deep. Nutricol-3 solution was added and diluted to 1:1000.
2. 250–300 mg/liter potassium chloride was added (FCC quality purchased from Dead Sea Chemical Products Israel). The chelating agent EDTA (ethylenediaminetetraacetic acid is used in the food industry) was also added to a final level of 0.5–1.0 mM.
3. $NH_4OH$ was kept in a concentration of 25 ±5 mg/liter.
4. The domesticated duckweed Lemna gibba L.cv. Galilee was cultivated in each of said ponds at an initial density of 400 g/$m^{-2}$. Duckweeds were harvested at intervals of 2–3 days, weighed, and 400 g/$m^{-2}$ returned to each pond.
5. After adding the above chemicals, pH adjustment (6.5±0.5) was carried out by introduction of food grade $H_3PO_4$ (or $KHCO_3$). Food grade phosphoric acid ($H_3PO_4$), was purchased from Rotem Fertilizers Ltd. Israel.
6. Water temperature fluctuated daily from 15° C. in the early morning to 27° C. during the afternoon.

b. Processing of the Plant Biomass:

After harvesting the higher plants from the liquid nutrient solutions, the plant biomass is steamed shortly to discard psychrotrophic bacteria which sticks to the outer plant tissue. The bacteria are common inhabitants of the growing solutions. The plant material is then ground in a food processor designed for meat grinding. The mashed plant biomass is filtered through a cheese cloth. After filtration, two fractions are achieved: (i) a dripped dark green liquid, designated 'sap' herein and constituting about 20% of the initial biomass weight; and (ii) a light green mashed texture designated 'pulp' in the present invention, 80% of the initial biomass.

c. Chemical Characterization of the Dried Products:

The dried sap contains more than 20% ash composed of non-volatile elements, wherein the term "ash", as used herein, refers to ash produced after heating at a temperature in excess of 5,000° C. The dried pulp contains only 12.5% ash, as shown in Table III.

TABLE III (Mg. per Kg. on dry weight basis)

| Element | Sap | Pulp | *Pulp Sap |
|---|---|---|---|
| Ag | 0.56 | 0.15 | |
| Al | 55.60 | 43.37 | |
| As | <0.02 | <0.02 | |
| B | 28.97 | 535.13 | 18.47 |
| Ba | 75.30 | 89.48 | |
| Bi | <0.04 | <0.04 | |
| Ca | 14426.92 | 14976.09 | 1.04 |
| Cd | 1.69 | 1.23 | 0.72 |
| Co | <0.008 | <0.008 | |
| Cr | 4.98 | 3.64 | |
| Cu | 47.87 | 26.67 | 0.56 |
| Fe | 1890.23 | 1103.23 | 0.58 |
| Hg | <0.01 | <0.01 | |
| K | 123949 | 68349.83 | 0.55 |
| Li | 0.95 | 0.49 | |
| Mg | 4647.75 | 4450.98 | 0.96 |
| Mn | 1537.20 | 1706.42 | 1.11 |
| Mo | 3.31 | 3.20 | 0.92 |
| Na | 13417.87 | 6606.73 | 0.49 |
| Ni | 1.48 | 1.26 | 0.85 |
| P | 45393.36 | 22656.47 | 0.499 |
| Pb | 2.25 | <0.02 | |
| Rb | 27.94 | 16.39 | 0.59 |
| S | 6151.59 | 4455.21 | 0.72 |
| Sb | 1.98 | 0.60 | |
| Se | 3.04 | 4.32 | 1.42 |
| Si | 26.99 | 18.99 | 0.70 |
| Sn | 1.11 | 0.71 | |
| Sr | 212.10 | 310.26 | |
| Zn | 379.44 | 270.95 | 0.71 |
| Total | 212,289.56 | 125,631.9 | 0.58 |
| Total (in 100 grams) | 21.2% | 12.5% | |

*Pulp = Affinity Coefficient
 Sap

EXAMPLE 2

Plant Cultivation and Iron Mineral Enrichment

The procedure of Example 1 was carried out with the following modification to a (2): 1–3×$10^{-2}$M EDTA (ethylenediaminetetraacetic acid as is used in the food industry) Fe salt was added.

EXAMPLE 3

Plant Cultivation and Iron Mineral Enrichment

The procedure of Example 1 was carried out with the following modification to a (2): 6–15 grams. of Fe in a 1.0 Liter stock solution was added and diluted 1:1,000. The source of Fe can be added in the form of food-grade quality $FeSO_4$ or Fe Fumarate.

The detectable 30 elements as shown in the domesticated plants (see Table III), are separated specifically and differentially in the two processed dried products.

The total amount of minerals concentrated in the sap ash is rather high, 21.2%. The pulp ash contains only 12.5% minerals. The results, concerning the mineral concentration, indicates that most of the minerals tend to concentrate specifically in the plant juice—the sap. Boron, which concentrates in the pulp is a specific exception. Iron, copper, zinc and potassium containing minerals, as well as other elements, are rinsed out from the mashed plants and accumulate finally in the processed dried sap.

As can be seen in Table III, the content of potassium in both the sap and pulp is at least 7 times greater than the sodium content thereof and therefore this product is ideally suited for consumption by persons requiring low sodium content in their food.

The extremely low heavy metal concentration, as detected and exemplified with the domesticated plants (Table II), can be used as a defined control system for the final products. The level of lead, mercury and other toxic elements are negligible in the final product, as shown in Tables III and IV.

Plants grown in open lagoons cannot be used as a course for industrial raw material since lead and mercury levels are near to the upper hazardous limits. On the other hand, plants grown domestically show a much lower level of lead and mercury levels as seen in Table IV.

The plant material was analyzed using the Induced Coupled Plasma (ICP)-AES method (Plasma Atomic Emission Spectroscopy).

TABLE IV

Record of Some non-volatile Toxic elements in the intact duckweed plants and its processed dried sap and pulp.
The following units indicate mg per kg dry matter.

|  | Domesticated | | | Open Lagoons |
| --- | --- | --- | --- | --- |
|  | Intact | Sap | Pulp | Intact |
| Arsenium (As) | <0.8 | <0.02 | <0.02 | <0.04 |
| Lead (Pb) | 0.7 | 2.25 | <0.02 | 15.4* |
| Mercury (Hg) | <0.03 | <0.01 | <0.01 | 0.94** |

*10 mg lead per 1 kg is the upper limit for materials used in the food industry.
**0.3 mg mercury per week is the upper limit for consumption allowance in food.

A simultaneous comprehensive analysis of 30 elements found in the products of the present invention is used to ensure and control the growing method, enrichment procedure and finally the quality of the processed products. Most of the records done for the present invention were operated under the supervision of Aminolab Ltd., Kiryat Weizmann, Rehovot 76123.

A single check of the non-volatile elements present in the ash enable an accurate record down to 1 part per billion.

The experiments shown in Table II and Table III were done on the domesticated duckweed Lemna Gibba CV Galilee which is a higher plant (Lamnaceae).

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the enrichment of selected mineral content of a duckweed plant comprising:

a) cultivating said plant in a soil-free growth medium;

b) introducing iron into a liquid component of said growth medium for uptake into said plant;

c) grinding said plant to form a mashed product; and d) separating liquid from said mashed product to form at least one concentrated extract product having an iron content of at least 1.200 mg/kg.

2. A process according to claim 1 for the enrichment of the potassium content of a higher plant comprising:

a) cultivating said plant in a soil-free growth medium;

b) introducing a source of potassium into a liquid component of said growth medium for uptake into said plant;

c) grinding said plant to form a mashed product; and d) separating liquid from said mashed product to form at least one concentrated extract product having a potassium content at least seven times greater than the sodium content thereof.

3. A process according to claim 1, wherein potassium constitutes more than 50% of the ash of said product.

4. A process according to claim 1, wherein said concentrated extract product is formed from pulp remaining after the removal of sap therefrom.

5. A process according to claim 1, wherein said concentrated extract product is formed from sap separated from the pulp thereof.

6. A concentrated duckweed plant extract product having a wt/wt iron content greater than that of the intact plant, said product having an iron content of at least 1,200 mg/kg.

7. A concentrate duckweed plant extract product according to claim 6, having a iron content at least two times greater than the manganese contact thereof.

8. A concentrated higher plant extract product according to claim 6, having a lead content less than 3 mg/kg dry matter.

9. A concentrated higher plant extract product according to claim 6, having a mercury content less than 0.3 mg/kg dry matter.

* * * * *

UNITED STATES PATENT AND TRADEMARK OFFICE
CERTIFICATE OF CORRECTION

PATENT NO. : 6,013,525
DATED : January 11, 2000
INVENTOR(S) : Dan Porath

It is certified that error appears in the above-identified patent and that said Letters Patent is hereby corrected as shown below:

Columns 3-4, end of Table I, after footnote insert second footnote:
--The data on the alternative products were extracted from the studies done by Gugenheim et al. (1991) and published in "Human Nutrition"-Magnes. Press. The Hebrew University Jerusalem (in Hebrew).--.

Column 5 Line 39 "Eenrichment" should read --Enrichment--.

Column 8 Line 21, Claim 1, "1.200" should read --1,200--.

Signed and Sealed this

Fourteenth Day of November, 2000

Q. TODD DICKINSON

*Attest:*

*Attesting Officer*  *Director of Patents and Trademarks*